United States Patent [19]
Swain et al.

[11] 3,719,293
[45] March 6, 1973

[54] TOBACCO HARVESTING

[75] Inventors: C. Winston Swain; Louis E. Dailey, Jr., both of Ahoskie, N.C.

[73] Assignee: Dailey Irrigation Co. Inc., Ahoskie, N.C.

[22] Filed: Jan. 13, 1971

[21] Appl. No.: 106,042

Related U.S. Application Data

[63] Continuation-in-part of Ser. No. 860,338, Sept. 23, 1969.

[52] U.S. Cl. .................................. 214/83.3, 198/179
[51] Int. Cl. ................................................ B60p 1/36
[58] Field of Search ............... 214/5.5, 83.3; 198/179

[56] References Cited

UNITED STATES PATENTS

| | | | |
|---|---|---|---|
| 2,704,158 | 3/1955 | Long | 214/5.5 |
| 3,342,353 | 9/1967 | Davis | 214/83.1 X |
| 2,930,494 | 3/1960 | Frushour et al. | 214/5.5 |
| 3,034,664 | 5/1962 | Davis | 214/5.5 |
| 2,702,134 | 2/1955 | Alphin, Jr. | 214/83.1 |
| 3,215,288 | 11/1965 | Long et al. | 214/83.1 X |
| 3,107,018 | 10/1963 | Mish, Jr. | 214/83.1 |

Primary Examiner—Albert J. Makay
Attorney—Raymond N. Matson

[57] ABSTRACT

The Hander-Passer attachment for use on a tobacco harvester that replaces individuals who were formerly used for this purpose; it being a unique way of handling or passing the tobacco directly from the primers or croppers to the loopers.

2 Claims, 9 Drawing Figures

INVENTORS
C. WINSTON SWAIN
LOUIS E. DAILEY, JR.

BY Carl T. Mach.
ATTORNEY

INVENTORS
C. WINSTON SWAIN
LOUIS E. DAILEY, JR.

BY Carl T. Mack
ATTORNEY

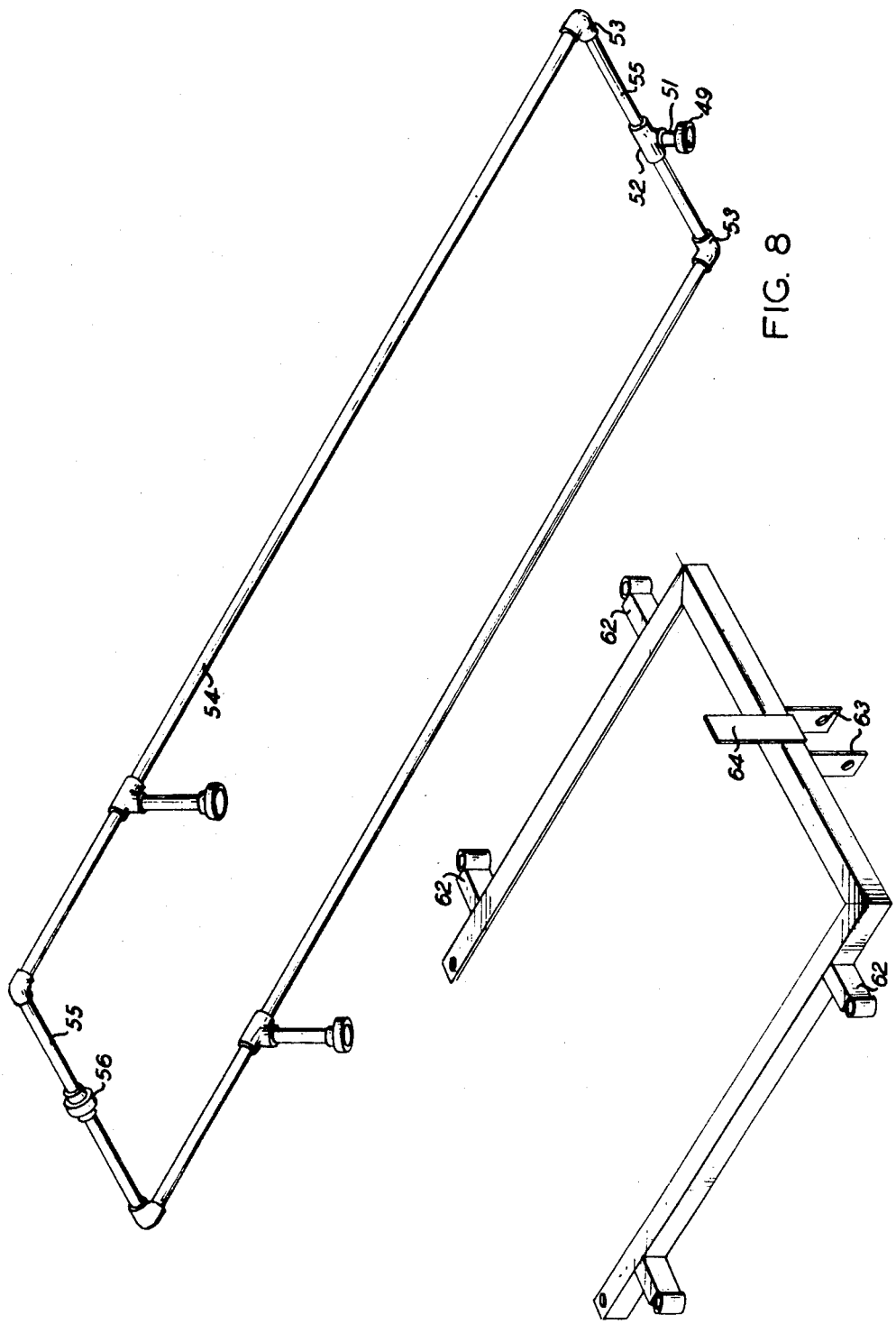

TOBACCO HARVESTING

This application is a continuation-in-part of application, Ser. No. 860,338, filed Sept. 23, 1969, for Tobacco Harvesting.

This invention is for assisting in the harvesting of various crops, especially tobacco and, specifically, that type harvesting a few leaves at a time from each stalk, normally referred to as flue-cured tobacco.

The general method of harvesting flue-cured tobacco prior to the introduction of the farm tractor was to have sleds drawn through the field by a mule or horse. There were usually four men (though the number may have varied depending on the specific situation from two to eight) that followed along with the sled, breaking a few of the lower leaves from each stalk and putting them into the sled. These men were called croppers or primers, as they were harvesting the tobacco by removing or priming the lower leaves that were in their prime from the stalk.

The sleds, when filled, were towed or pulled to the curing barn by the mule or horse. The sleds were sometimes mounted on wheels to enable them to turn more easily and be filled with a larger load. The wheel-mounted sleds were called tobacco trucks, even though they were towed by mules or horses. When the sled or truck reached a shed beside the curing barn it was detached from the mule or horse. The mule or horse was then hitched to an empty sled or truck and returned to the field. The sled or truck was unloaded and the tobacco prepared for curing by a crew at the curing barn. Usually five or six tobacco sleds or trucks were required, and two mules or horses. One sled was in the field at all times being loaded, one at the barn being unloaded, one on the way between field and barn, and an empty one waiting to return to the field.

The crew at the curing barn removed the tobacco from the trucks and tied it on sticks about 4½ feet in length for hanging in the curing barn. Then the tobacco was hung in shaded outdoor racks to await hanging in the barn by the field crew (primers or croppers) at the end of the day. The individuals who removed the tobacco from the trucks were called handers or passers, since they picked up three or four leaves at a time (about the same amount that had been cropped from a stalk in the field) and handed or passed it to the individual who tied it onto the sticks. Those who tied the leaves on the sticks were called loopers, as the tobacco was looped back and forth over both sides of the sticks.

An effective operation usually required two or three loopers to keep up with four primers in the field, and three handers for each looper, as one of the handers was required to also remove the looped or tied tobacco from the looping rack and place it into the storage rack. Thus, a normal size crew consisted of four croppers, six handers, two loopers, and two drivers for the mules or horses, a minimum total of 14 or 15 people.

When the tractor came into use, it was necessary to leave out every fifth row in a field in order for the tractor not to destroy the crop when it replaced the mule or horse for the purpose of pulling the sled or truck through the field. Tobacco was under acreage control. This caused a delay in use of the tractor for tobacco harvesting until the tobacco farmers obtained the necessary approval to plant additional acreage to make up for the area omitted by leaving out every fifth row.

After this approval was granted, the sleds were almost eliminated as wheel-mounted tobacco "trucks" could be much wider and thus carry more tobacco. The general practice now is to plant tobacco in four-row sections. The four-row sections had little effect on the harvesting procedure previously described except to replace the mules or horses with tractors.

Many attempts have been made to build a tobacco harvester that would eliminate the handers, as much labor is required to remove the tobacco from the trucks and hand or pass it directly to the looper. Until very recently, all these methods were based either on the solid-row planting or the four-row section, as no other skip-row method was approved for tobacco allotment. U.S. Pat. No. 3,229,831, dated Jan. 18, 1966, is one example of this type of harvester. Some harvesters consisted of mounted platforms that would move above the tobacco growing in the field with the croppers or primers riding by sitting in seats that are suspended from the platform above. The tobacco was conveyed to the platform for looping and then transferred to another vehicle for portage to the curing barns. Other types suspended both the loopers and croppers in the same row and transferred the tobacco to the harvester after it was looped on the sticks. It was then transferred for portage to the curing barn via another vehicle. These large harvesters have not generally been accepted by the farmers, especially those with small tobacco allotments.

Approval was first obtained about 2 years ago to plant tobacco in two-row sections, and every third row may now be omitted and additional land planted to compensate for the omitted rows. This acreage allotment approval, enabling tobacco farmers to grow the crop in two sections without any acreage allotment penalty, was necessary to enable tobacco harvesting attachments to be developed and mounted on a farm trailer as is accomplished by this invention.

The general objective of this invention is to adapt the regular method of harvesting tobacco (described above) to a farm trailer with special mounted detachable attachments and drawn by a farm tractor, to provide a method of efficient harvesting and complete preparation of green tobacco in the field for the curing barn by making maximum use of equipment and methods generally being used by the tobacco farmer growing flue-cured tobacco in two-row sections.

Some of the advantages to the tobacco farmer is that he will be able to harvest his crop with five or six people instead of being burdened with obtaining 14 or 15 people to harvest tobacco under labor-shortage conditions. The personnel required consists of two primers or croppers, two loopers, and two tractor drivers. As all the personnel are riding, the physical work is not as physically demanding and all the personnel are protected from the sun since the harvester has a canvas top that shades the working area as it moves through the field.

Other objectives and advantages of the invention will be apparent from the following description considered in conjunction with the accompanying drawings wherein:

FIG. 8 is a detachable adjustable tripod mounting for top and adjustable primer seats, and FIG. 9 is a portable pallet and shield support frame.

Figure 1:
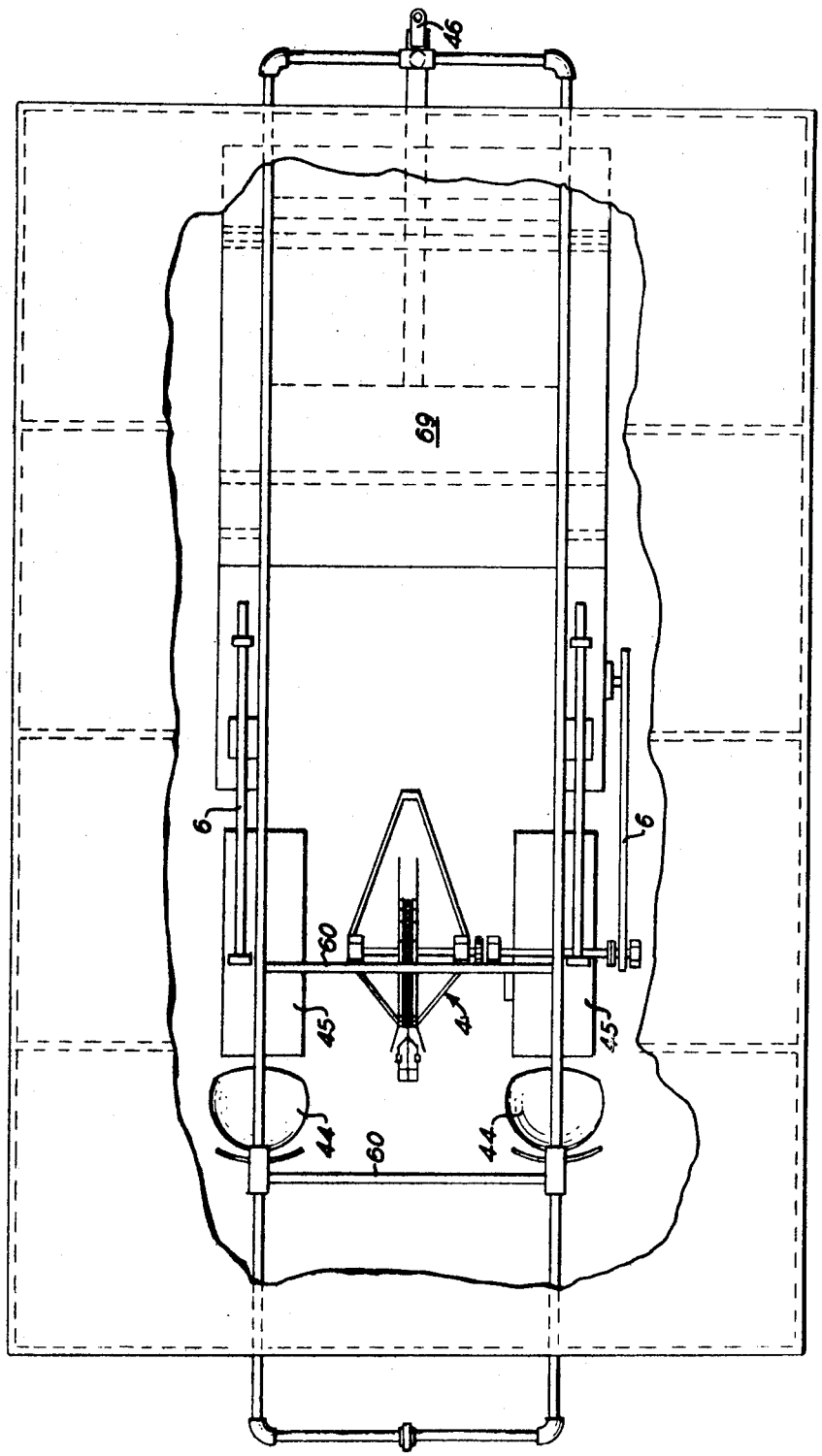
FIG. 1 is a top or plan view of the harvester.
Figure 2:
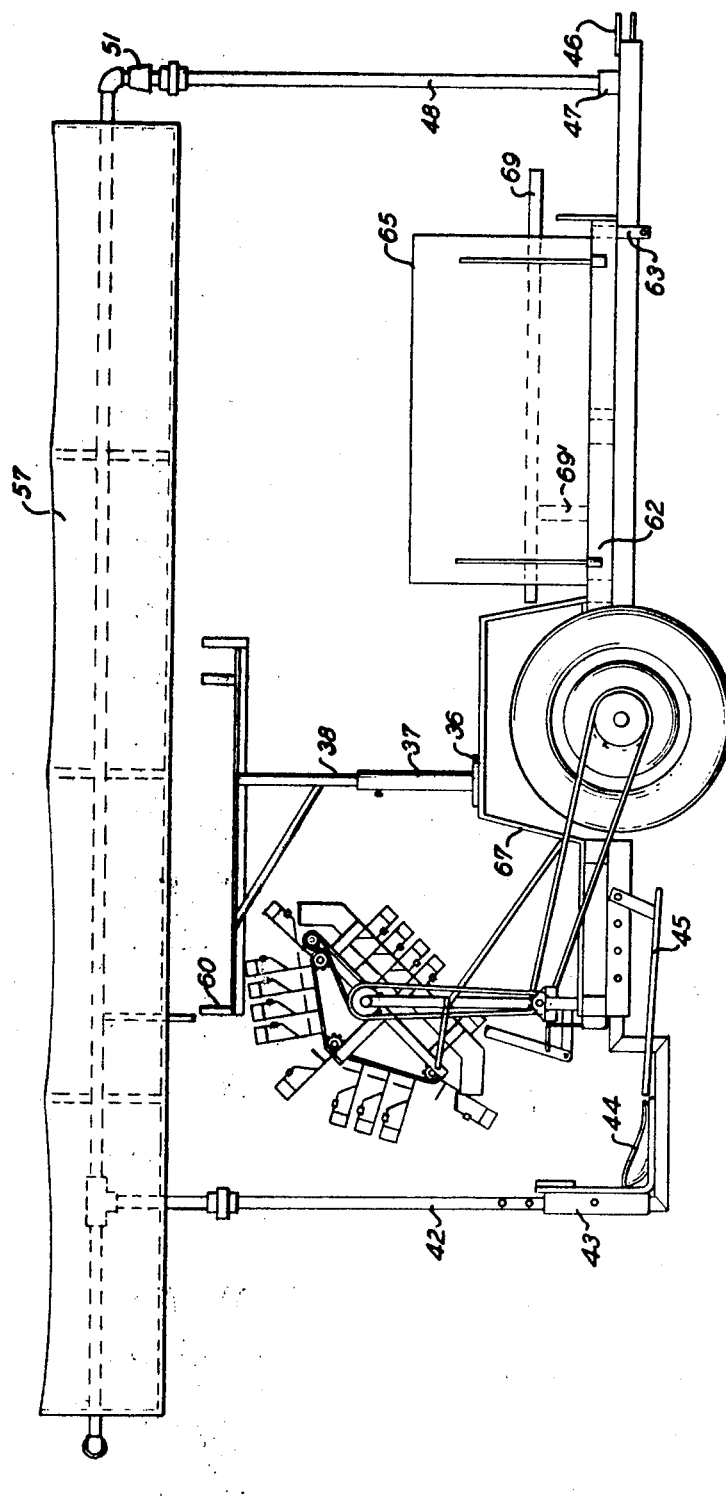
FIG. 2 is a right-side elevational view of the harvester.
Figure 7:
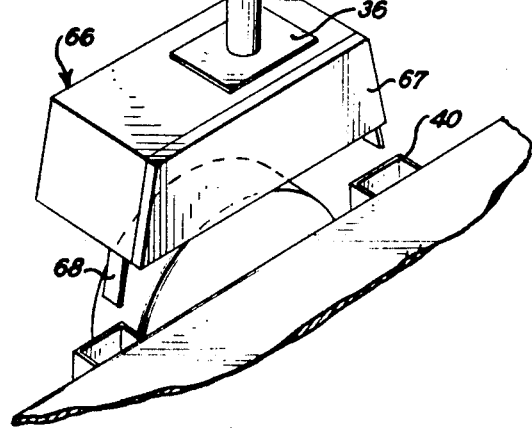
FIG. 7 is a detachable fender and looping rack.

The farm trailer 1, mounted with the tobacco harvesting attachments, is shown in FIGS. 1 and 2. The trailer is attached at 46 to a farm tractor (not shown) and is adapted to be towed down the omitted third rows of tobacco plants in the tobacco field in the same manner in which a farm tractor tows a regular farm trailer. Seated in the adjustable primer seats 44 placed at the rear of the harvester, as shown, are accommodations for two workers who prime or crop the lower two or three prime or ripe tobacco leaves from the stalk. After breaking the leaves from each stalk, these workers place them into one of the hands 29 (see FIG. 5) of which there are usually about 16 in number of the hander-passer mechanism 70 having divergent ends 72, 74 shown in FIGS. 3 and 4. The rollers 26 on the hands 29 engage the sides of the channel 70 first at its divergent end 72 to move the hands together. The divergent ends 74 permit the hands 29 to move away from each other by spring action. The tobacco is passed through the channel of the hander-passer and handed to one of two workers' loopers at the opposite end of the hander-passer standing on the trailer. The looper then loops or ties the tobacco on the sticks that are placed on the detachable fender-looping racks shown in FIG. 7. When the stick is loaded with tobacco, this worker (looper) removes the stick from the rack 60 and lays it on the pallet 69 located on the front of the trailer. The two loopers work alternately; looping their individual sticks as the other is tying off a stick and laying it on the pallet 69. The Hander-Passer uniformly passes and hands the tobacco from the two primers to one of the loopers and the loopers loop alternately. This facilitates a continuous forward motion of the harvester through the field.

When the pallets 69 are filled with tobacco (about 40 or 50 sticks), a regular farm tractor with a hydraulic fork-lift attachment picks it up and removes the pallet to the door of the curing barn for hanging in the barn.

All the attachments to the trailer for tobacco harvesting are detachable, enabling the farm trailer to be used for regular farm purposes. The manner of detaching each accessory is shown by FIGS. 3 and 4 for the Hander-Passer, FIG. 6 for the Drive Unit, FIG. 7 for the Fender and Looping Rack, FIG. 8 for the Tripod Mounting (top and adjustable primer seats), and FIG. 9 for the portable pallet and shield support frame.

Attention is called to the fact that the Hander-Passer attachment has completely replaced individuals formerly used for the purpose of passing and handing the tobacco from the sled or "trucks" to the loopers.

It is obvious from the previous description that this equipment is most suitable, adaptable, and useable in the handling and harvesting of green tobacco planted in two-row sections. The harvesting can be done continuously and with minimum effort, expense, and personnel.

Figure 3:
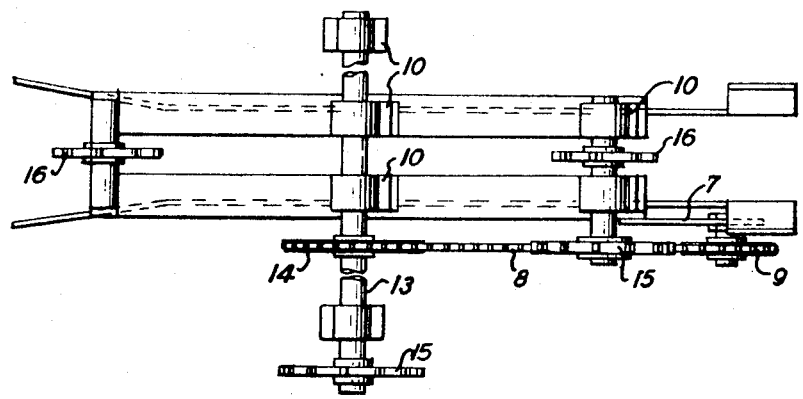
FIG. 3 is a top or plan view of the hander-passer attachment.
Figure 4:
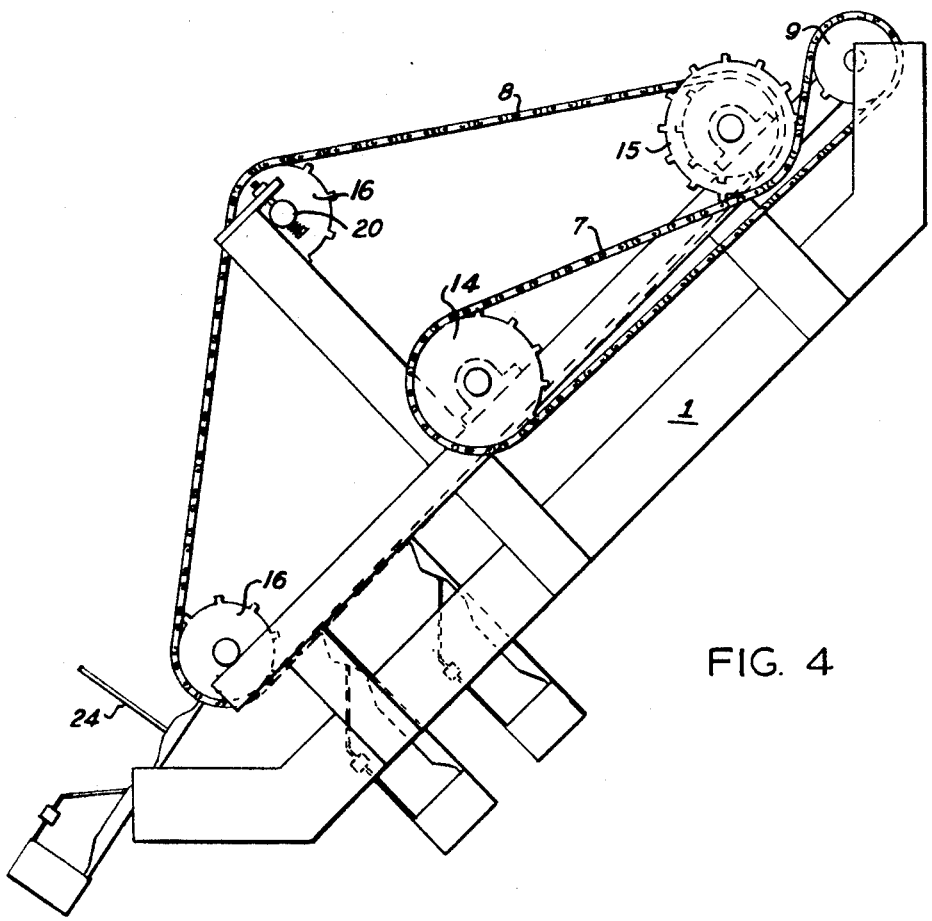
FIG. 4 is a side view of the FIG. 3 hander-passer.
Figure 5:
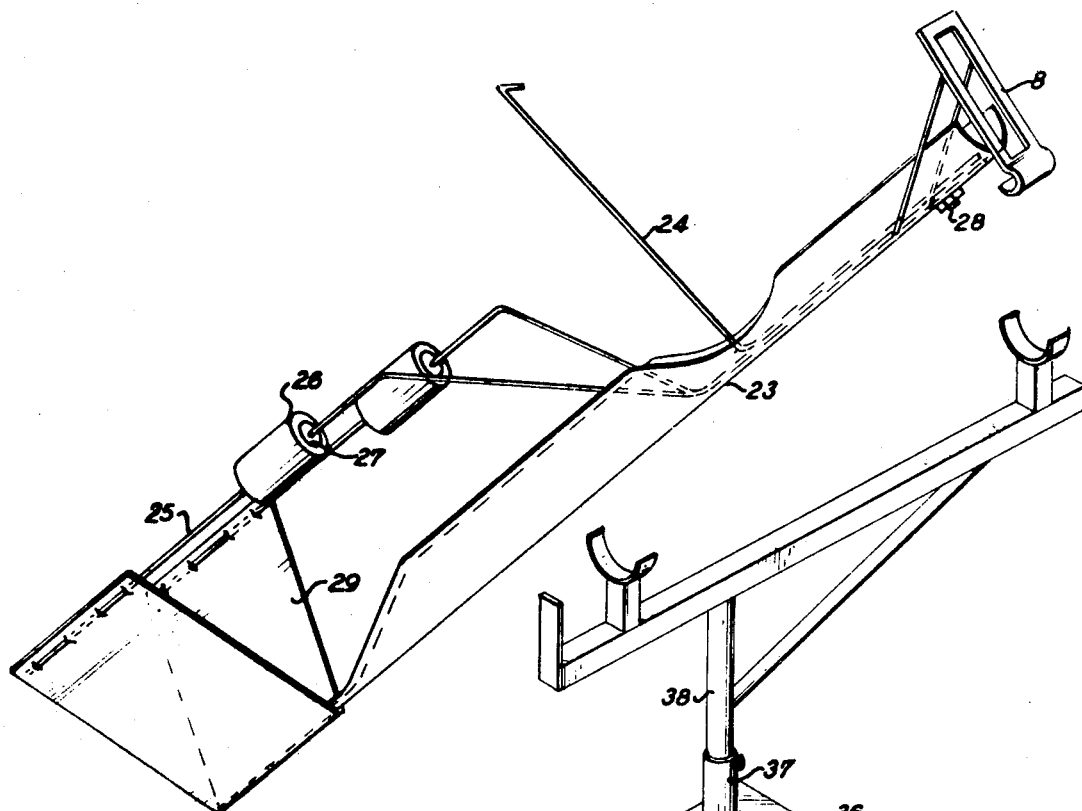
FIG. 5 is a side view of one of the hands.

The Hander-Passer attachment, FIGS. 2, 3 and 4 that replaces individuals that were formerly used for this purpose, is a unique way of handling or passing the tobacco directly from the primers or croppers to the loopers. This attachment and its method of doing the work for which it is intended is fully disclosed by FIGS. 3, 4 and 5. The frame for the Hander-Passer is composed of two strips of angle iron 1½ × 1½ inches and about 30 inches long, said strips being connected by two strips of flat iron 3/16 × 2 inches or 6 inches placed 3 inches apart. An iron channel is made of two strips of sheet iron, ⅛ × 3 × 38 inches, angled at the top ends ⅛ × 3 × 4 inches and at the bottom end ⅛ × 3 × 6 inches. Six strips of flat iron 3/16 × 2 × 8 inches, attaching the frame for the Hander-Passer to the angle iron channel. Three strips are located on each side of the channel and extend up to the frame.

Figure 6:
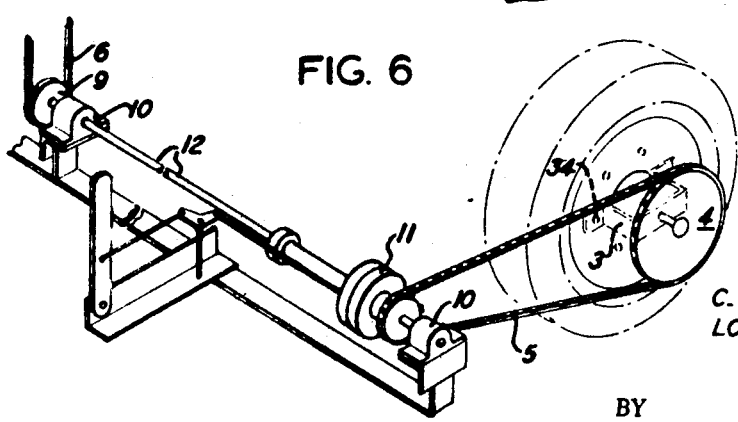
FIG. 6 is a drive unit; from the trailer wheel to the hander-passer attachment.

In FIG. 6 there is shown a jack shaft 3 attached to the trailer wheel 32 to obtain power for the Hander-Passer. A sprocket 4 is attached to the jack shaft 3 and a drive chain 5 drives the shaft 12 on which the disengagement assembly 11 is mounted. In FIG. 3 there is shown a shaft 3, three-fourths inch in diameter and 21 inches long, upon which is mounted a sprocket 14 for a No. 52 chain. Two 13-tooth sprockets for a No. 52 chain are shown in FIG. 4. In FIG. 3 there are three 9-tooth sprockets for a No. 65 chain. One piece of flat iron 17 has a slot drilled therein for attaching to the foundation of the Hander-Passer, one end being drilled with a ¾ inch hole for attaching the drive sprocket. In FIG. 4 there is one ¾ inch shaft, 5 inches long, which is drilled with two 7/16 inch holes, one on each end of the shaft for inserting a tension spring bolt adjustment. In FIG. 4 reference 21 represents one of 25 bolts, 16 ⅜ inch bolts, 1¼ inches long for attaching ball bearings to the frame. Nine bolts are used for attaching the frame to the harvester and for attaching the sprockets to the foundation. Reference character 23 is one of 16 arms attached to the Hander-Passer chain, holding links 10 inches long. Element 24 is one of 16 4½ inch spring wire spacers. Element 25 is a spring wire, there being 16 spring wires forming 32 fingers at each end. Element 26 is one of 32 nylon rollers which are held in place by washers 27, individual to each roller. Reference 28 is one of 16 ¼-inch bolts 1 inch long, to attach spacers, fingers and arms to the chain holding links 8. Reference 29 is one of 16 hands or rubber bands, 2 × 12 inches, with holes punched in them for attachment to the arms and fingers, said fingers being used to grasp the hands of tobacco passed to them for delivery to the loopers.

Reference characters 36 are directed to two looping rack bases ⅜ × 4 × 6 inches supporting two pipes 37 and 38, pipe 38 being adjustably supported by pipe 37.

The parts of the trailer chassis and the canvas top shown in the figures have been labeled but it is so obvious to one skilled in the art how these parts function that no description in detail will be given.

One foot from the top support is a 42 inch rack for holding tobacco sticks. The rack is made of 1 inch angle iron pieces. A frame, 61, for supporting the shields 65 and pallet, is 52 inches long and 45 inches wide and constructed of angle iron. The shields 65 are used on the frame (part No. 62) and inserted into pipes, said shields being used to support tobacco on the sleds which are taken to the curing barn.

It will be obvious to those skilled in the art that various changes may be made in the invention without departing from the spirit and scope thereof and therefore the invention is not limited by that which is illustrated but only as indicated in the accompanying claims.

What is claimed is:

1. A mobile tobacco harvesting machine having a frame and supporting wheels for movement between but not above rows of tobacco plants comprising, in combination, at least one seat positioned on the rearward portion of said frame; an endless conveyor for harvested tobacco leaves positioned adjacent and forwardly of said seat and having hands movable toward and away from each other to alternately grasp and release respectively tobacco leaves; means for keeping said hands open prior to the receipt of leaves thereby; means for closing said hands about said leaves for delivery to said frame comprising a channel having convergent and divergent ends, and rollers mounted on said hands and engageable with said convergent end of said channel to move said hands toward each other; and means for reopening said hands after said delivery.

2. The combination recited in claim 1 wherein said means for reopening said hands on leaving the divergent end of said channel comprises spring means.

* * * * *